United States Patent [19]
Glazebrook

[11] Patent Number: 5,780,711
[45] Date of Patent: Jul. 14, 1998

[54] PRESSURE INDICATOR WITH RELATIVELY MOVABLE SCREEN AND DIAL

[75] Inventor: Richard Glazebrook, Derbyshire, United Kingdom

[73] Assignee: Gaslow International Limited, United Kingdom

[21] Appl. No.: 722,007

[22] PCT Filed: Feb. 3, 1995

[86] PCT No.: PCT/GB95/00217

§ 371 Date: Dec. 18, 1996

§ 102(e) Date: Dec. 18, 1996

[87] PCT Pub. No.: WO95/27891

PCT Pub. Date: Oct. 19, 1995

[30] Foreign Application Priority Data

Apr. 6, 1994 [GB] United Kingdom ............... 9406817

[51] Int. Cl.$^6$ ............... G01C 17/38; G01L 19/10
[52] U.S. Cl. ............... 73/1.71
[58] Field of Search ............... 73/1.57, 1.71, 73/705, 708, 709, 712, 729.1, 729.2, 732, 736, 740, 751, 756, 865.1; 33/810; 345/94

[56] References Cited

U.S. PATENT DOCUMENTS 3,757,320  9/1973  Heath ............... 33/810
3,990,309  11/1976 Beckwith et al. ............... 73/708
4,139,278  2/1979  Matsumoto et al. ............... 345/94
4,276,776  7/1981  Lapeyre ............... 73/729.1
5,119,677  6/1992  Porter ............... 73/865.1

Primary Examiner—William L. Oen
Attorney, Agent, or Firm—Jones & Askew

[57] ABSTRACT

A pressure gauge including an indicating element and a pressure sensing element. The indicating element includes an opaque screen and an indicator dial that are relatively movable, the screen and dial being relatively moved along a path of movement between first and second limits of movement in a progressive manner in response to a variation of pressure sensed by the sensing element. The screen is arranged to mask the dial from view and is provided with a window through which a portion of the dial can be viewed during the relative movement. The dial has two visibly distinct regions on its surface which is visible through the window, the visibly distinct regions being juxtaposed to one another along the path of movement. A first of the regions is in registry with the window when the sensed pressure is at or above a first predetermined pressure, and a second of the regions is in registry with the window when the sensed pressure is at or below a second predetermined pressure which is lower than the first predetermined pressure.

10 Claims, 6 Drawing Sheets

PRESSURE INDICATOR WITH RELATIVELY MOVABLE SCREEN AND DIAL

BACKGROUND OF THE INVENTION

The present invention primarily relates to a gauge for use in liquefied gas systems for indicating when a predetermined quantity of liquefied gas remains in a storage tank supplying the gas.

A gauge for such a purpose is described in our European Patent 0052609.

The gauge includes a pointer moving over a scale; the pointer being moved by sensing means which continually senses the gas pressure in the storage tank. The scale on the gauge is shown in FIG. 3 of European Patent 0052609 as being divided into 3 regions 20, 21 and 22 corresponding to 3 zones B, C and D respectively of a graph shown in FIG. 1 of the present specification (which is a reproduction of FIG. 1 in European Patent 0052609). Whilst the pointer is in region 20 or 21a useful amount of liquefied gas is present in the storage tank.

A problem associated with a gauge having a pointer moving over a scale is that it can be confusing to read. This arises due to the fact that the gauge is continually exposed to variations in pressure within the system and as a result the pointer is continually moving across the face of the gauge dial.

It has been found in practice that users on seeing the pointer moving through region 20 toward region 21 mistakenly believe that the supply of liquefied gas is about to expire or believe that the movement results from a gas leak.

SUMMARY OF THE INVENTION

It is therefore desirable to provide a gauge which, although exposed to constantly changing gas pressures, shows only one reading whilst the gas pressure is above a first predetermined value corresponding to a first predetermined quantity of liquefied gas remaining in a storage tank and thereby gives a clear indication that the tank does not require changing.

The gauge desirably further only shows one reading whilst the gas pressure is below a second predetermined value corresponding to a second predetermined quantity of liquefied gas in said storage tank which is less than said first predetermined quantity and thereby gives a clear indication that the storage tank requires replacing.

The gauge desirably further shows a progressively variable reading inbetween said first and second predetermined values in order to give a progressive warning that liquefied gas contained in the storage tank is approaching, during use, said second predetermined quantity of liquefied gas.

According to one aspect of the present invention there is provided a pressure gauge including indicating means and pressure sensing means, the indicating means including an opaque screen and an indicator dial which are relatively movable, the screen and dial being relatively moved along a path of movement between first and second limits of movement in a progressive manner in response to variation of pressure sensed by the sensing means, the screen being arranged to mask the dial from view and being provided with a window through which a portion of the dial can be viewed during said relative movement along said path, the dial having two visibly distinct regions on its surface which is visible through the window, the visibly distinct regions being juxtaposed to one another along the path of movement, a first of said regions being arranged to be in registry with the window when the pressure sensed by the sensing means is at or above a first predetermined pressure and a second of said regions being arranged to be in registry with the window when the pressure sensed by the sensing means is at or below a second predetermined pressure which is lower than the first predetermined pressure.

Preferably the opaque screen is stationary and the dial is arranged to move along said path. The dial may be arranged to move along a linear or curved path. Preferably it is arranged to move about a circular path.

Preferably the dial is in the form of a disc mounted for movement about a central pivotal axis.

The window has a width dimension extending laterally of said path of movement and a length dimension extending longitudinally of said path of movement.

Preferably each of said visibly distinct regions when viewed through the window extend along said path of movement in a visibly constant manner and each have a longitudinal dimension which is equal to or greater than the length dimension of the window.

Preferably the first or second visibly distinct regions are arranged to extend across the full length of the window once the pressures sensed by the sensing means are either above said first predetermined pressure or below said second predetermined pressure respectively and thereby only give two distinct gauge readings irrespective of the position of the dial along said path when being moved in response to pressure either above said first predetermined pressure or below said second predetermined pressure respectively.

Preferably a third visibly distinct region is provided inbetween said first and second visibly distinct regions, said third visibly distinct region preferably having a longitudinally dimension less than the length dimension of the window.

Alternately, the third visibly distinct region may have a longitudinal dimension equal to or greater than the length dimension of the window. In such an arrangement the gauge gives three distinct gauge readings, viz. one reading for pressures above said first predetermined pressure, one reading for pressures below said second predetermined pressure and one reading for pressures inbetween the first and second predetermined pressures.

This arrangement is particularly useful for a gauge fitted to say a fire extinguisher as it gives an easily identifiable reading indicating when the extinguisher requires replacement (ie. internal pressure is either too low or too high).

Preferably all of the visibly distinct regions on said dial have a width dimension equal to or greater than the width dimension of the window.

Preferably the pressure sensing means and/or indicating means are arranged to continuously respond to changes in pressure over a range of pressures between a predetermined low pressure and a predetermined high pressure, the predetermined low pressure being lower than said second predetermined pressure and the predetermined high pressure being higher than said first predetermined pressure.

Preferably said predetermined high pressure is less than the maximum system pressure to which the sensing means is exposed.

Preferably the gauge has a body housing the pressure sensing means and the indicating means, the indicating means comprising a dial in the form of a disc centrally mounted on a shaft rotated by said sensing means and a statically mounted opaque screen overlying the disc so as to totally mask the disc from view, the screen having a window through which a portion of the disc can be viewed. Preferably the opaque screen comprises a transparent cover mounted on the body to overlie the disc, the cover housing an opaque layer on at least one surface.

Various aspects of the present invention are hereinafter described, with reference to the accompanying drawings, in which.

DESCRIPTION OF THE PREFERRED EMBODIMENTS

Figure 8:
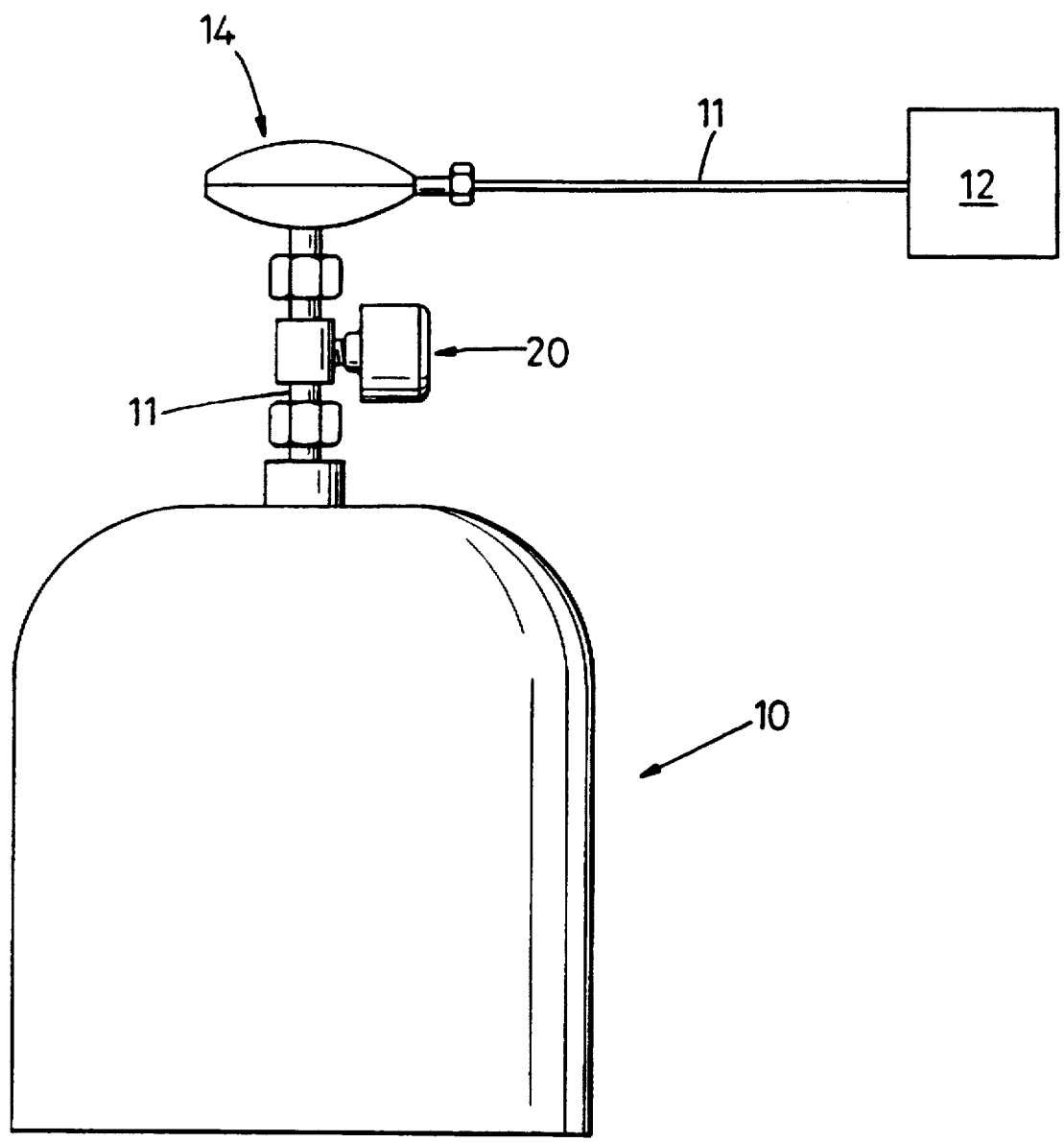
FIG. 8 is a diagrammatic illustration showing a gauge of the present invention in use.

Referring initially to FIG. 8 there is shown a typical liquefied gas system including a storage tank 10 for liquefied gas which is connected by a conduit 11 to one or more appliances 12 via a pressure regulator 14.

According to a first embodiment of the present invention there is provided a pressure responsive gauge 20 connected to conduit 11 on the upstream side of the regulator 14.

Figure 3:
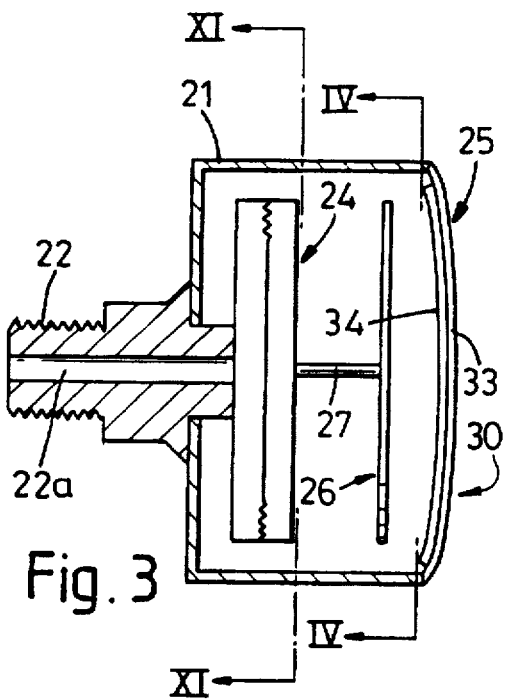
FIG. 3 is an axial sectional view of the gauge shown in FIG. 2.
Figure 4:
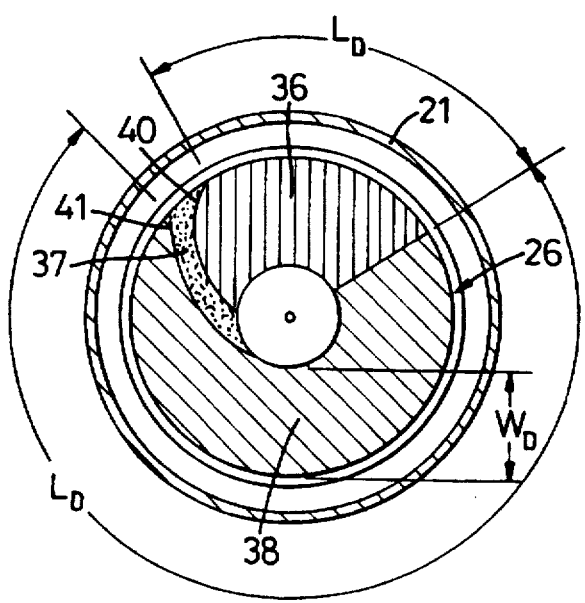
FIG. 4 is a sectional view along line IV—IV in FIG. 3.

The gauge 20 includes a body 21 having a conduit coupling 22 having a central bore 22a for connecting the gauge to pressurised gas; the body 21 further including gas pressure sensing means 24 (shown schematically in FIG. 3) and indicating means 25.

The indication means 25 includes a rotatable dial in the form of a disc 26 centrally mounted on a shaft 27 which is mechanically linked to the the sensing means 24 so as to be rotated thereby. The disc 26 is totally masked from view by an overlying opaque screen 30 save for a portion viewable through a window 32 formed in the screen 30. Conveniently the screen 30 is formed by a transparent cover 33 mounted on the body 21 to overlie the disc 26 and an opaque layer 34 formed on one surface of the cover 33, preferably the internal surface facing the disc 26. The transparent cover 33 may be formed from a suitable plastics material or glass. The opaque layer 34 may be formed by a film of plastics material or sheet of opaque material, such as card or paper, or may be formed by printing.

The surface of the disc 26 facing the opaque screen 30 is provided with three visibly distinct regions 36, 37 and 38 respectively which are arranged in juxtaposition in the direction of rotary motion of the disc 26.

Preferably the visibly distinct regions 36, 37 and 38 are defined by different coloured sectors, for example region 36 may be red, region 37 may be yellow and region 38 may be green. In addition, the shade and density of colour in each sector is preferably constant throughout the respective sector.

Regions 36 and 38 each have a longitudinal dimension $L_D$ in the direction of rotation of the disc 26 which is greater than the length dimension $L_S$ of the window 32. All regions 36, 37 and 38 each have a width dimension $W_D$ which is greater than the width dimension of the window $W_S$.

Figure 5:
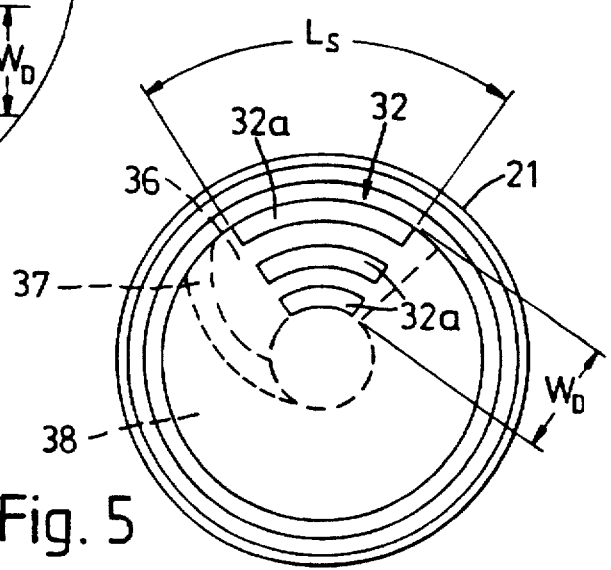
FIG. 5 is a front view of the gauge shown in FIG. 2.
Figure 6:
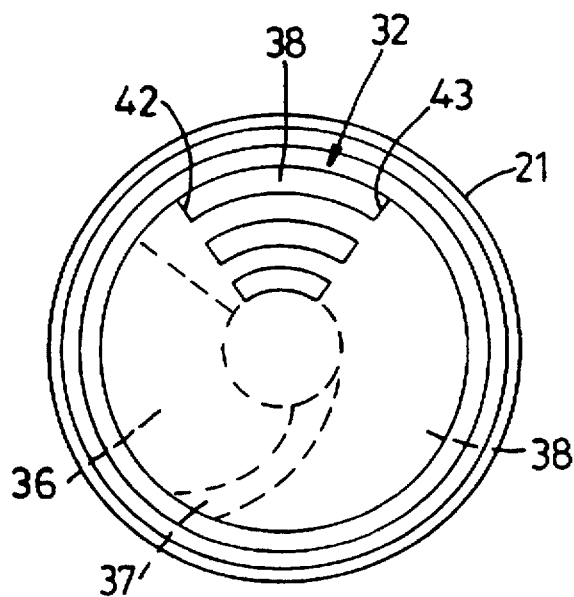
FIG. 6 is a view similar to FIG. 5 illustrating the gauge providing a different reading to that shown in FIG. 5.

The disc 26 is rotated less than 360° by the pressure sensing means 24 between two limits of movement shown in FIGS. 5 and 6.

In the position shown in FIG. 5, the disc 26 is located at one limit of movement corresponding to zero pressure. In the position shown in FIG. 6 the disc 26 has been rotated in a clockwise direction to the other limit of movement corresponding to a maximum pressure to be read by the gauge.

This limit of movement may be defined by a stop (not shown) acting on the disc 26 to prevent further rotation in the clockwise direction even though the pressure sensing means 24 may be exposed to higher pressures.

Figure 7A:
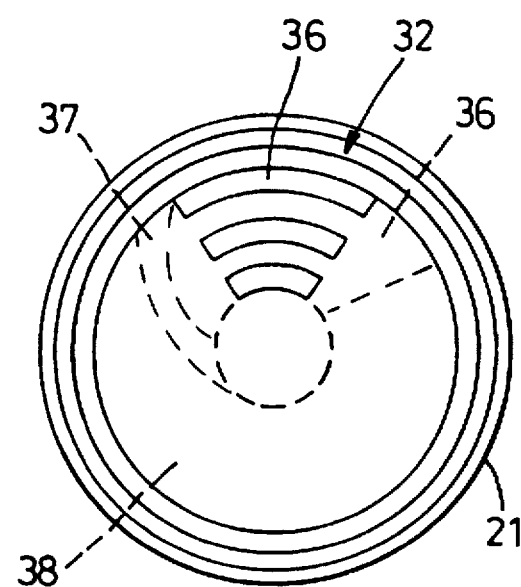
FIGS. 7a to 7c are front views similar to FIG. 5 showing positions of the dial intermediate those shown in FIGS. 5 and 6.
Figure 7B:
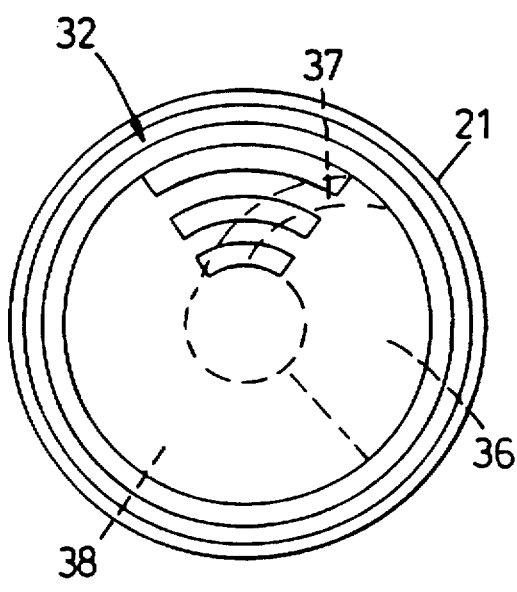
Figure 7C:
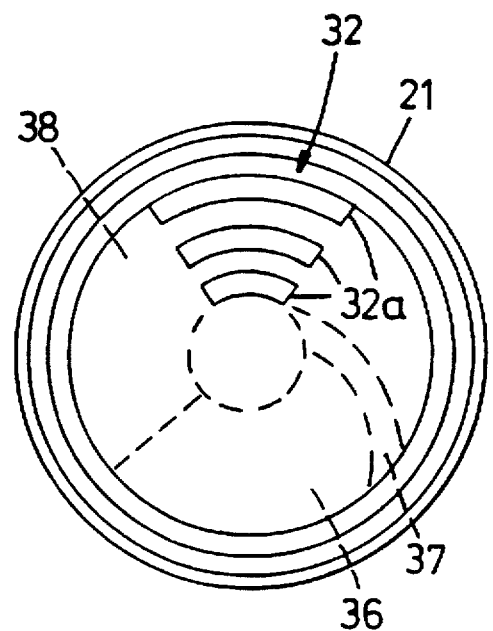

The boundary 41 between region 37 and 38 is located at a position which will underlie the side edge 43 of the window 32 when the disc 26 has been rotated to an intermediate position as shown in FIG. 7c by the sensing means 24 in response to sensing a first predetermined pressure.

At this point region 38 is in full registry with the window 32 and will remain so for all positions of the disc 26 between the intermediate position shown in FIG. 7c and the limit position shown in FIG. 6, ie for all pressures above the first predetermined pressure.

Since region 38 is of a constant shade and density movement of the disc 26 between the positions shown in FIGS. 6 and 7c caused by the sensing means 24 sensing a pressure higher than the first predetermined pressure will not visibly affect the gauge reading shown through window 32.

Similarly the boundary 40 between region 36 and 37 is located at a position which will underlie the side edge 42 of window 32 when the disc 26 has been rotated to an intermediate position as shown in FIG. 7a by the sensing means 24 in response to sensing a second predetermined pressure.

At this point, region 36 is in full registry with the window 32 and will remain so as the sensed pressure drops and the disc 26 is moved by the sensing means 24 in the anticlockwise direction. Since the region 36 is of a constant shade and density, such movement of the disc 26 does not visibly affect the gauge reading shown through the window 32.

For pressures inbetween the first and second predetermined values the region 37 located between boundaries 40, 41 will be visible through the window. Thus as the sensed pressure drops from the first predetermined pressure toward the second predetermined pressure, the region 37 will move progressively across the window from side edge 43 to side edge 42. Also region 36 will progressively fill more of the window.

Accordingly, the gauge gives two distinct readings corresponding to when either region 36 or 38 is in full registry with the window 32 and these readings are unaffected by movement of the disc 26 as it moves within two zones of movement, viz between the positions in FIGS. 6 and 7c, and between the positions in FIGS. 5 and 7a respectively.

In addition, the gauge gives a variable reading which progressively changes to indicate pressure changes between the first and second predetermined values.

Figure 1:
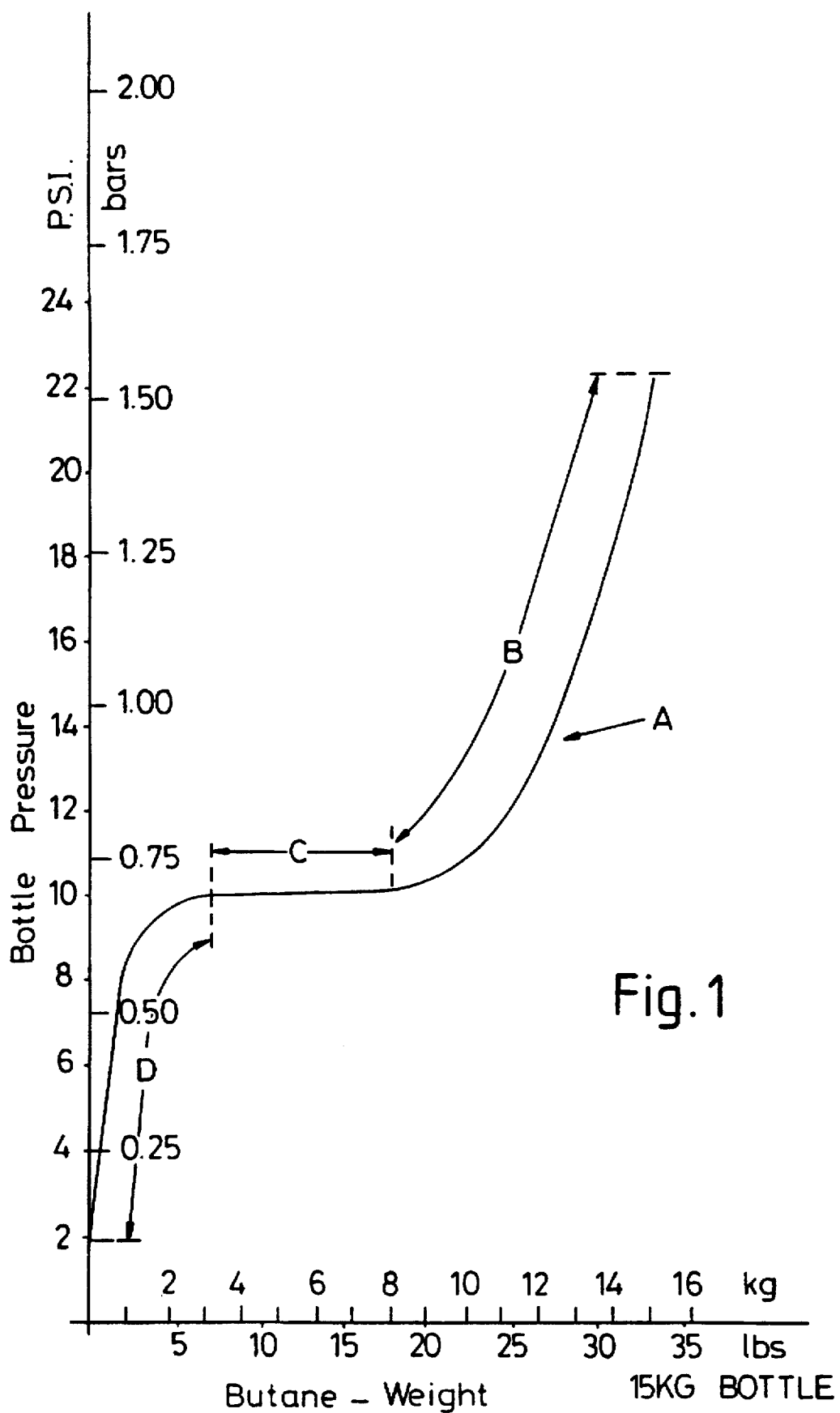
FIG. 1 is a graph for butane showing the relationship between gas pressure and weight of liquefied gas within a container during controlled release of gas from the container.
Figure 2:
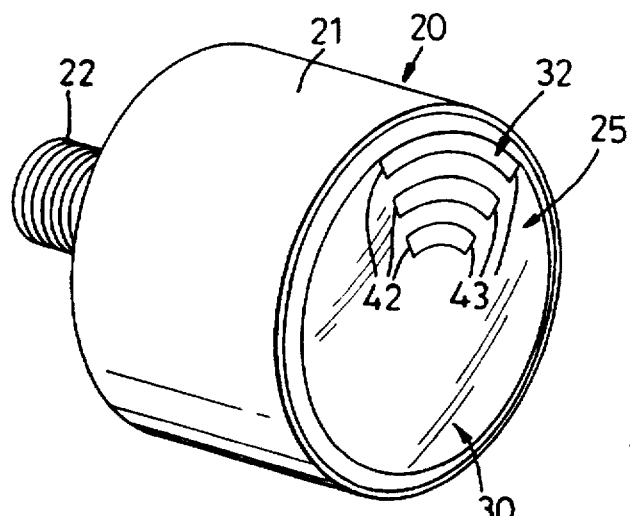
FIG. 2 is a perspective view of a gauge according to one embodiment of the present invention.

The first and second predetermined pressures are preferably determined by reference to the graph as shown in FIG. 1 which gives a correlation of liquefied gas remaining in a container v. sensed pressure in the container during consumption of gas so that whilst region 38 is in full registry with the window the gauge indicates that an adequate amount of liquefied gas is contained in the tank 10 and so does not warrant replacement; whereas whilst region 36 is in full registry with the window, the gauge indicates that the tank is usefully exhausted and requires replacement. Preferably the first predetermined pressure is chosen from the range of pressures covered by region C and D of the graph and the second predetermined pressure is chosen from the range of pressures covered by region D. By way of illustration, for butane, the first predetermined pressure is about 10 psi which corresponds to the upper region portion of region D and lower region of portion C and the second predetermined pressure is about 3 psi.

The relationship shown by the graph of FIG. 1 is temperature dependent, ie for higher temperatures the corresponding pressures are higher and for lower temperatures the corresponding pressures are proportionately lower.

In the illustrated embodiment, the side edges 42, 43 of the window 32 are linear and are radially located with respect to the axis of rotation of the disc 26.

In order to accommodate for temperature changes, the boundaries 40, 41 are preferably curved in the manner illustrated so that the radially innermost end and radially outermost end of each boundary 40, 41 are located at different angular positions on the disc 26; the outermost end being located downstream of the innermost end when the disc 26 moves in an anti-clockwise direction.

The degree of curvature chosen for boundaries 40, 41 is chosen in order to provide meaningful readings over a predetermined temperature range for example between 0° C. to 35° C.

To assist in readings of the gauge, the window 32 is preferably divided into bands 32a; the innermost band being read for hot environments and the outermost band being read for cold environments. An intermediate band is provided for environments of an intermediate temperature. More or fewer bands 32a may be provided.

It will be appreciated that no bands can be provided so that the window 32 is completely open. In addition, it will be appreciated that the boundaries between the visibly distinct regions needn't be curved but can be linear, for example defined by a radial boundary line.

It is to be appreciated that region 37 is desirable but not essential. Accordingly region 37 may be omitted so that boundaries 40, 41 overlie one another with regions 36, 38 being side by side.

The disc 26 is illustrated as being mechanically linked with the sensing means 24. It is envisaged that the sensing means may be electrically linked to drive the disc 26. In such a situation, the sensing means and gauge may be at remote locations.

Figure 11:
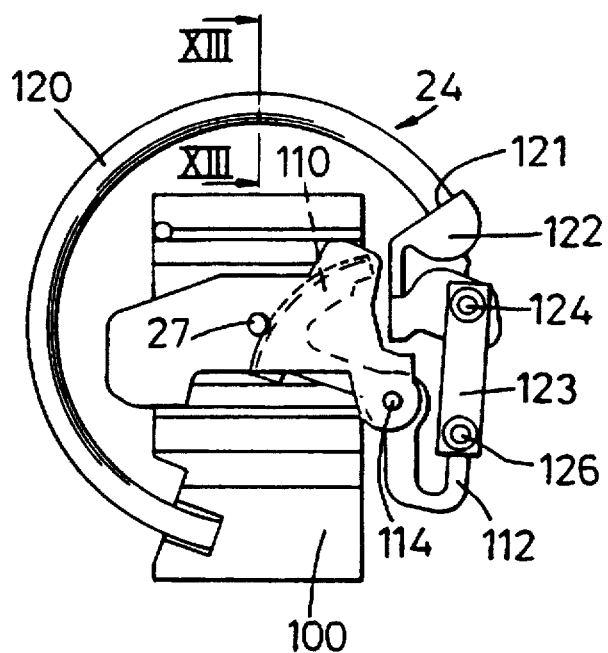
FIG. 11 is a section along line XI—XI corresponding to the position of the shaft shown in FIG. 5.

A suitable sensing means 24 is illustrated in FIG. 11. The sensing means 24 comprises a support block 100 mounted on the body 21 of the gauge and having an internal bore (not shown) communicating with the central bore 22a.

Shaft 27 is rotatably supported on the block 100 and includes a pinion gear (not shown) in driving connection with a gear segment 110 formed on the end of a pivoted lever 112. The lever 112 is pivotally connected to the block 100 by a pivotal connection 114.

A hollow arcuate pressure tube 120 is mounted at one end on the block 100 and communicates internally with the bore 22a. The opposite end 121 of tube 120 is closed and is fixedly connected to a connection member 122.

The connection member 122 is connected to one end of a pivotal link 123 via pivotal connection 124 and the opposite end of the link 123 is connected to the lever 112 via a pivotal connection 126.

In use, gas enters the interior of tube 120 and increase in gas pressure causes the tube 120 to straighten, ie. the end 121 is moved outwardly. Such movement causes the lever 112 to deflect and in so doing causes the gear segment 110 to drive shaft 27.

In FIG. 11, the gear segment is located at one limit of movement corresponding to a predetermined low pressure (driven to be below said second predetermined pressure) for example 0 psi and in FIG. 12 the gear segment is located at its opposite limit of movement corresponding to a predetermined high pressure (chosen to be above said first predetermined pressure). At the opposite limit of movement of the segment 110, the segment 110 engages a stop shoulder 130 on the support block 100.

Figure 12:
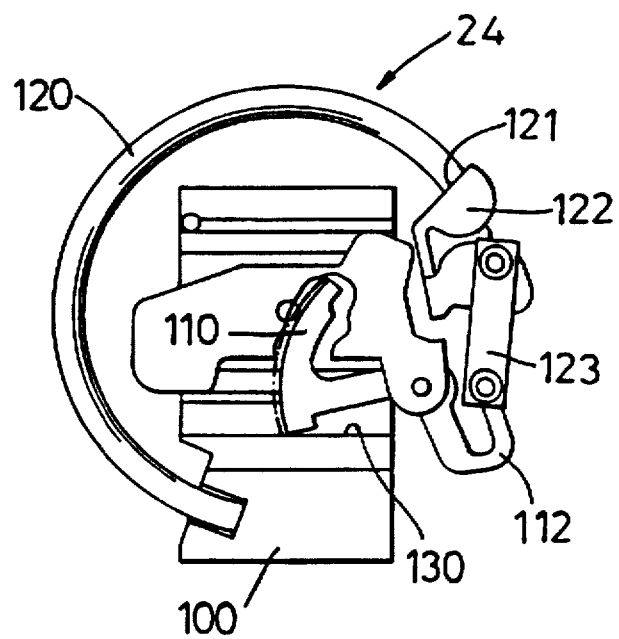
FIG. 12 is a section along line XI—XI corresponding to the position of the shaft shown in FIG. 6.

The movement of the segment 110 between the positions shown in FIGS. 11 and 12 correspond to the positions of the disc shown in FIGS. 5 and 6 respectively.

The predetermined high pressure is preferably less than the maximum pressure in the system, for example in butane systems where pressure in excess of 200 psi can be experienced, the predetermined high pressure limit is preferably about 120 psi ie. located in the lower portion of region B on the graph of FIG. 1.

Accordingly, the disc 26 is arranged to undergo angular displacement approaching 360° corresponding to the range of pressures between the predetermined low and high pressures only. This enables the length of the window $L_s$ to be relatively large thereby providing a relatively large and easily identifiable visual indication.

Figure 13:
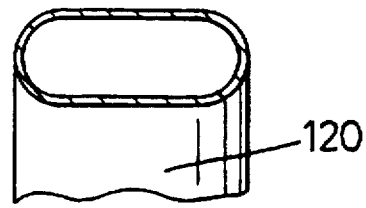
FIG. 13 is a section along line XIII—XIII in FIG. 11.

The construction of the tube 120 is such as to enable it to deform outwardly in a resilient manner for pressures in excess of the predetermined high pressure. In this respect, the cross-section of the tube 120 is preferably generally rectilinear having curved sides as shown in FIG. 13.

The gauge described above is located to read pressure variations on the upstream side of the regulator 14.

It is envisaged that the gauge may be arranged to read pressure variations on the downstream side of the regulator 14.

On the downstream side of the regulator, the gas pressures are substantially lower, for example less than 1 psi and so the sensing means requires to be more sensitive for monitoring pressure changes.

If the gauge is to be mechanically driven, a sensor and drive arrangement similar to that disclosed in UK Patent Specification 2221534 may be used.

The gauge shown in FIGS. 2 to 8 is particularly suited for use in liquefied gas systems.

It is envisaged that the gauge could be used in other pressurised gas systems in which predetermined conditions are pressure dependent.

An example is use with fire extinguishers. Fire extinguishers are normally pressurised ready for use. If the pressure is too low the extinguisher will not function properly. If the pressure is too high, the extinguisher may be dangerous to use.

Accordingly, the pressure in the extinguisher should lie between predetermined low and high pressures.

The gauge of the present invention can be used to give an easily identifiable reading that the pressure lies between the predetermined low and high pressures or is moving toward one of those pressures.

Figure 9:
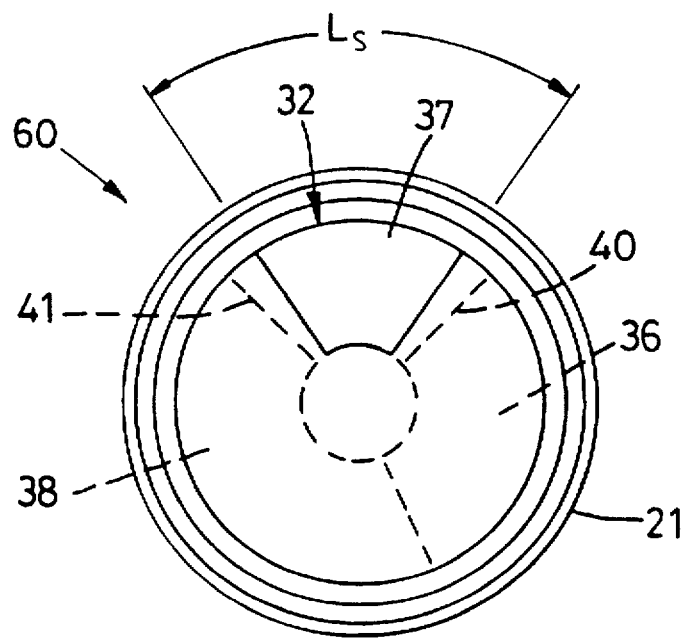
FIG. 9 is a view similar to FIG. 5 of a second embodiment according to the present invention.
Figure 10:
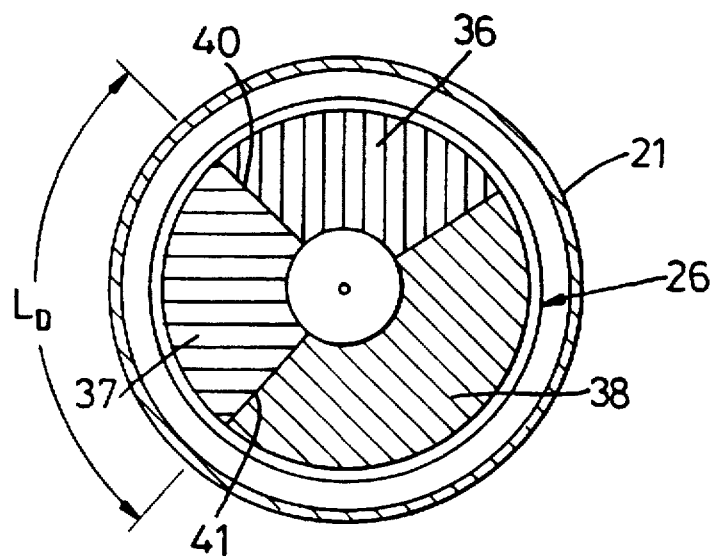
FIG. 10 is a view similar to FIG. 4 of the second embodiment.

A modified gauge 60 suitable for this purpose is illustrated in FIGS. 9 and 10.

The gauge 60 shown in FIGS. 9 and 10 is the same as that described previously except that the window 32 is fully open and the disc 26 is provided with a third visibly distinct region 37 which has a longitudinal dimension $L_D$ which is longer than the length dimension $L_S$ of the window 32.

The boundaries 40, 41 are preferably radial lines and are located so that over a range of acceptable pressures between predetermined low and high pressures the region 37 remains in full registry with the window 32.

I claim:

1. A pressure gauge including indicating means and pressure sensing means, the indicating means including an opaque screen and an indicator dial which are relatively movable, the screen and dial being relatively moved along a path of movement between first and second limits of movement in a progressive manner in response to variation of pressure sensed by the sensing means, the screen being arranged to mask the dial from view and being provided with a window through which a portion of the dial can be viewed during said relative movement along said path, the dial having two visibly distinct regions on its surface which is visible through the window, the visibly distinct regions being juxtaposed to one another along the path of movement, a first of said regions being arranged to be in registry with the window when the pressure sensed by the sensing means is at or above a first predetermined pressure and a second of said regions being arranged to be in registry with the window when the pressure sensed by the sensing means is at or below a second predetermined pressure which is lower than the first predetermined pressure.

2. A pressure gauge according to claim 1 wherein the window has a width dimension extending laterally of said path of movement and a length dimension extending longitudinally of said path of movement, each of said visibly distinct regions when viewed through the window extending along said path of movement in a visibly constant manner and each having a longitudinal dimension which is equal to or greater than the length dimension of the window.

3. A pressure gauge according to claim 2 wherein a third visibly distinct region is provided inbetween said first and second visibly distinct regions.

4. A pressure gauge according to claim 3 wherein the third visibly distinct region has a longitudinal dimension less than the length dimension of the window.

5. A pressure gauge according to claim 3 wherein the third visibly distinct region has a longitudinal dimension equal to or greater than the length dimension of the window.

6. A pressure gauge according to claim 3, wherein all the visibly distinct regions have a width dimension equal to or greater than the width dimension of the window.

7. A pressure gauge according to claim 1 wherein the pressure sensing means and/or indicating means are arranged to continuously respond to changes in pressure over a range of pressures between a predetermined low pressure and a predetermined high pressure, the predetermined low pressure being lower than said second predetermined pressure and the predetermined high pressure being higher than said first predetermined pressure.

8. A pressure gauge according to to claim 7 wherein said predetermined high pressure is less than the maximum system pressure to which the sensing means is exposed.

9. A pressure gauge according to claim 1 including a body housing the pressure sensing means and the indicating means, the indicating means comprising a dial in the form of a disc centrally mounted on a shaft rotated by said sensing means, the opaque screen being statically mounted to overlie the disc so as to totally mask the disc from view.

10. A pressure gauge according to claim 9 wherein the opaque screen comprises a transparent cover mounted on the body to overlie the disc, the transparent cover housing an opaque layer on at least one surface.

* * * * *